Figure 1:
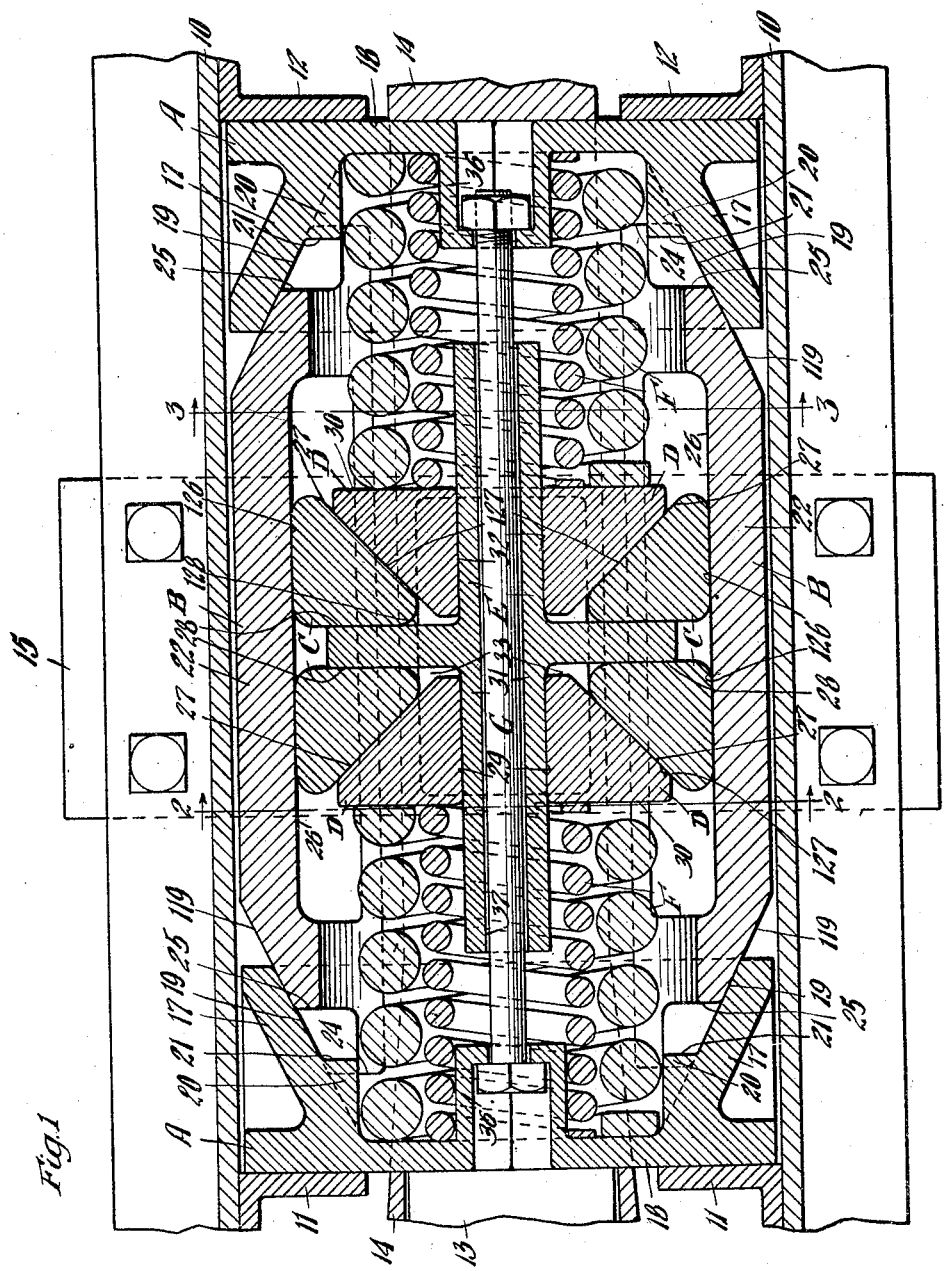

May 25, 1926.

S. B. HASELTINE

FRICTION SHOCK ABSORBING MECHANISM

Filed Sept. 12, 1924    2 Sheets-Sheet 1

1,585,709

Witnesses

Wm. Geiger

Inventor
Stacy B. Haseltine
By George I. Haight
His Atty.

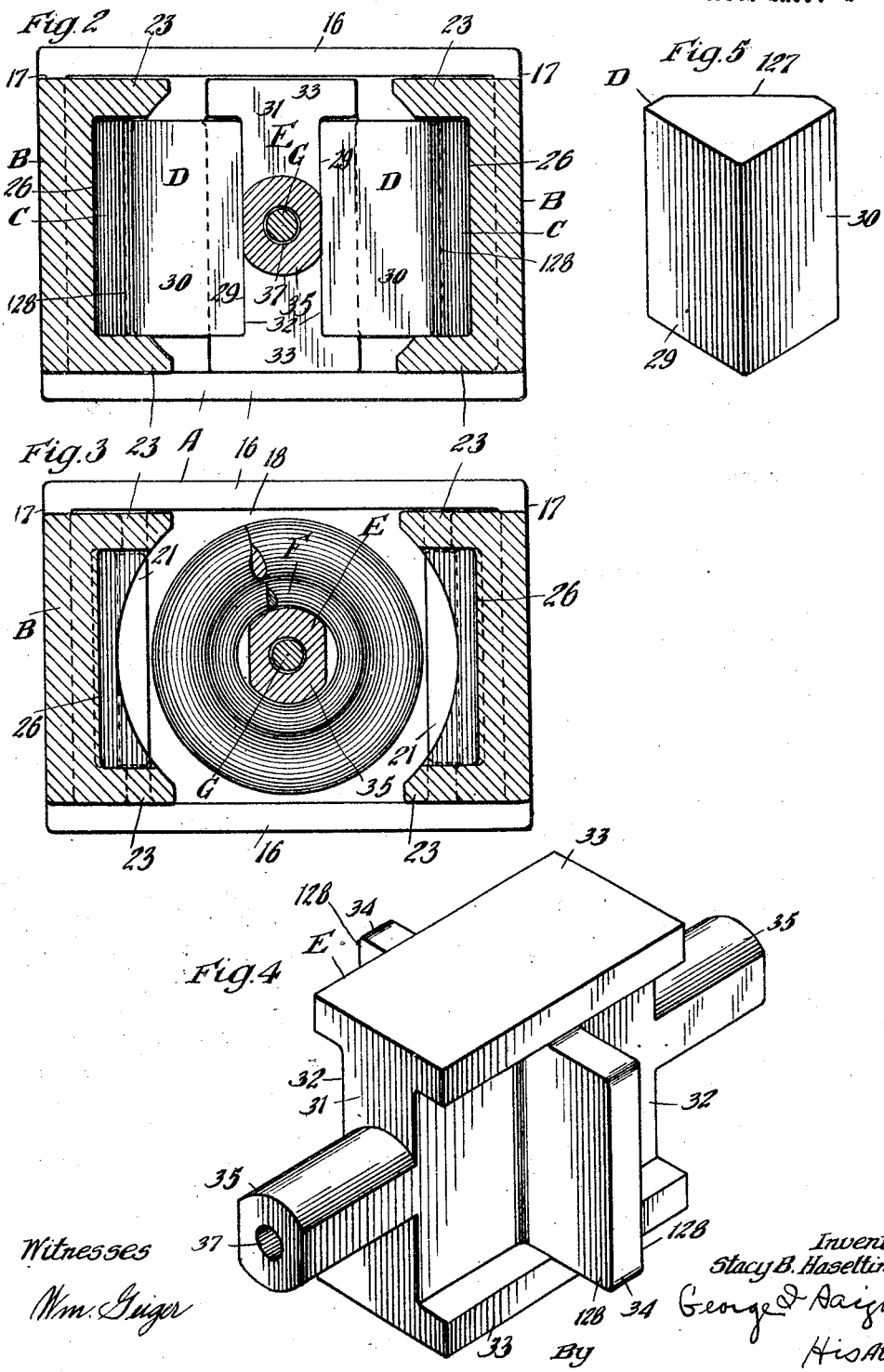

Patented May 25, 1926.

1,585,709

UNITED STATES PATENT OFFICE.

STACY B. HASELTINE, OF CHICAGO, ILLINOIS, ASSIGNOR, BY MESNE ASSIGNMENTS, TO W. H. MINER, INC., A CORPORATION OF DELAWARE.

FRICTION SHOCK-ABSORBING MECHANISM.

Application filed September 12, 1924. Serial No. 737,350.

This invention relates to improvements in friction shock absorbing mechanisms.

One object of the invention is to provide a friction shock absorbing mechanism, especially adapted for railway draft riggings, wherein is obtained high capacity due to relatively large frictional areas, together with certain release.

Another object of the invention is to provide a mechanism of the character indicated, including follower acting wedge means and wedge friction elements, together with yielding means for resisting movement of the various friction and wedge means, wherein the yielding means is operated to directly actuate the follower acting wedge means during release, independently of the remaining friction wedge elements.

Other objects and advantages of the invention will more fully and clearly appear from the description and claims hereinafter following.

In the drawings forming a part of this specification, Figure 1 is a horizontal, longitudinal, sectional view of a portion of a railway draft rigging, showing my improvements in connection therewith. Figures 2 and 3 are vertical, transverse, sectional views of the shock absorbing mechanism proper, corresponding respectively to the lines 2—2 and 3—3 of Figure 1. And Figures 4 and 5 are detailed, perspective views respectively, of a friction element and a friction wedge shoe used in connection with my improved mechanism.

In said drawings, 10—10 denote channel-shaped center or draft sills of a railway car underframe, to the inner faces of which are secured front stop lugs 11—11 and rear stop lugs 12—12. A portion of the drawbar is indicated at 13, to the inner end of which is operatively secured a hooded yoke 14 of usual construction. Within the yoke is disposed the shock absorbing mechanism proper. The movable parts of the draft rigging are supported in operative position by a detachable saddle plate 15.

The improved shock absorbing mechanism proper, as shown, comprises broadly, front and rear followers A—A; two side wedge friction elements B—B; four wedge blocks C—C; four friction shoes D—D; a central friction member E; tandem arranged spring resistance elements F; and a retainer bolt G.

The front and rear main followers A are of like construction and are adapted to coact with the front and rear stop lugs respectively. Each of said followers comprises top and bottom walls 16—16, vertically disposed, spaced side walls 17—17, and a transverse end wall 18. The end wall 18 is adapted to directly engage the corresponding stop lugs in the manner of the usual follower. The side walls 17 of each follower are inclined with reference to the longitudinal axis of the mechanism and the opposed side walls of each follower converge outwardly, presenting interior wedge faces 19 adapted to coact with the corresponding side elements B. On the interior of each follower the side walls 17 are provided with enlargements 20 presenting vertical, transverse end faces 21 adapted to coact with the side elements B to limit the relative inward movement of the front and rear followers during compression of the mechanism.

The side friction wedge elements B are arranged on opposite sides of the longitudinal axis of the mechanism and are of like construction. Each of the elements B is provided with a longitudinally extending side wall 22 provided with upper and lower, inwardly extending flanges 23 adapted to overhang the corresponding wedge blocks C and form top and bottom guides therefor. At the front and rear ends of the elements B the upper and lower flanges 23 project outwardly and are provided with transverse, flat end faces 24. The side wall 22 of each element B is provided with flat transverse, vertical end faces 25 adapted to coact with the corresponding faces 21 of the front and rear followers to limit the relative inward movement of the latter. At the front and rear ends the side wall 22 of each element B is cut away at an angle to the longitudinal axis of the mechanism, corresponding to the inclination of the adjacent face 19 of the corresponding follower A, thus providing front and rear wedge faces 119 adapted to co-act respectively with the corresponding wedge faces 19 of the followers. On the inner side, the side wall 22 of each element B presents a longitudinally disposed, elongated flat surface 26 adapted to cooperate with corresponding wedge blocks C.

The wedge blocks C, which are four in number, are arranged in pairs at opposite sides of the mechanism, and the blocks are all preferably of like construction. Each block is provided with a flat outer side face 126 adapted to cooperate with the friction surface 26 of the corresponding friction wedge element B. On the inner side, that is, the side nearest the axis of the mechanism, each shoe C has a wedge face 27, the wedge faces of each pair of opposed shoes C diverging outwardly of the mechanism. At the inner end, each shoe is provided with a transverse, flat face 28 adapted to co-operate with the central friction element E.

The friction wedge shoes D, which are also four in number, are arranged in pairs at opposite sides of the mechanism and each shoe is provided with a wedge face 127 similarly inclined to the wedge face 27 of the corresponding block C and adapted to co-operate therewith. Each shoe D on the side thereof nearest the axis of the mechanism is provided with a longitudinally disposed, flat friction surface 29 also adapted to co-operate with the central friction element. The shoes D are also provided with flat end faces 30 forming abutment means for the inner end of the corresponding spring resistance element F.

The central friction element E, as most clearly shown in Figures 1 and 4, comprises a longitudinally disposed block-like body member 31 presenting longitudinally disposed, vertical friction surfaces 32 on the opposite sides thereof, adapted to co-operate with the friction faces 29 of the shoes D. The block 31 is provided with top and bottom, horizontally disposed plate-like sections 33 projecting at opposite sides of the block presenting top and bottom flanges forming guides for the corresponding friction shoes D. Midway between the ends thereof, the element E is provided with laterally extending, vertically disposed flanges 34 at the opposite sides thereof, each flange 34 presenting front and rear transverse friction surfaces 128 adapted to co-operate with the friction surfaces 28 of the corresponding pairs of front and rear wedge blocks C. The block portion 31 of the friction member E has cylindrical extensions 35 at the front and rear ends thereof, said extensions being disposed midway between the top and bottom edges of the element E. As clearly shown in Figure 4, the opposite sides of the cylindrical extensions 35 are flattened and lie in the planes of the side surfaces 32 of the block 31, thus providing guides co-extensive with the side surfaces 32, co-operating with the flat friction faces 29 of the wedge friction shoes D.

The spring resistance elements F are tandem arranged, one element being interposed between the front follower A and the front set of wedge friction shoes D and the other element being interposed between the rear follower A and the rear set of friction shoes. Each spring resistance, as shown, preferably comprises a relatively light inner coil and a relatively heavier outer coil, the coils being held in central position by the corresponding cylindrical extension 35 of the friction member E and a hollow boss 36 inwardly projecting from the end wall 18 of the corresponding follower A.

The parts of the mechanism are held in assembled relation and under initial compression by the retainer bolt G which has its opposite ends anchored respectively in the hollow boss 36 of the front and rear followers A and has the shank thereof extending through a longitudinal bore 37 in the member E.

The operation of the mechanism during a compression stroke and assuming a buffing action is as follows. As the front follower A is moved toward the rear follower, the side friction wedge elements B are forced to travel laterally toward the axis of the mechanism, and as the same approach each other, due to the wedging action between the co-acting faces of the same and the followers, the wedge blocks C will be forced laterally toward each other, sliding on the friction surfaces 128 of the flanges 34 of the element E. As the wedge blocks C at the opposite sides of the mechanism approach each other, the front and rear shoes D will be forced outwardly toward the corresponding main follower A, sliding on the surfaces 32 of the element E. The spring resistance elements F will thus be compressed between the friction shoes and the corresponding followers, being compressed from both ends by the shoes and followers respectively. This action will continue until the abutment faces 21 and 25 of the followers and side elements B come into engagement, whereupon relative movement of the followers will be limited as hereinbefore pointed out. The side elements B will thus act as a column-load-sustaining means for transmitting the load from the front to the rear follower and the rear stop lugs, thereby preventing the spring resistance elements from being driven solid.

During draft, the action of the mechanism will be the reverse of that just described, the rear follower being moved toward the front follower which is held stationary.

Upon reduction of the actuating force, the initial action will be a release of the wedge-acting front and rear followers A due to the expansion of the spring elements F which directly bear on the followers. Outward movement of the followers will relieve the wedging action on the elements B, permitting the springs to force the wedge shoes, wedge blocks and elements B to normal position, these parts being automatically centered by reason of the arrangement thereof. In this connection, it is pointed out that the shoes D are preferably made of such a length that their outer ends will project slightly beyond the end edges of the block 31 of the central friction member E so that the initial compression of the springs may operate to maintain the various friction surfaces in intimate contact as wear develops thereon.

I have herein shown and described what I now consider the preferred manner of carrying out my invention, but the same is merely illustrative and I contemplate all changes and modifications that come within the scope of the claims appended hereto.

I claim:

1. In a friction shock absorbing mechanism, the combination with side members having longitudinally disposed interior surfaces; of a longitudinal pressure-transmitting element, said element being inwardly movable, said element and members having co-acting means thereon for effecting lateral approach of said members upon relative inward movement of said element; a friction member having longitudinally and laterally disposed friction surfaces; a plurality of friction wedge elements co-operating with the longitudinal surfaces of said side members and the longitudinal and transverse surfaces of said friction member; of a main spring resistance interposed between certain of said friction wedge elements and said pressure-transmitting element.

2. In a friction shock absorbing mechanism, the combination with side members having longitudinally disposed, interior walls; of relatively movable, pressure-transmitting elements, said elements and members having co-acting means thereon for effecting lateral approach of said members upon relative inward movement of said elements; a friction device having longitudinally disposed friction surfaces; a plurality of friction wedge blocks co-operating with the longitudinal walls of said members; a plurality of friction shoes co-operating with the longitudinal friction surfaces of said friction device, said shoes and blocks having co-operating wedge faces; and a main spring for resisting movement of said shoes.

3. In a friction shock absorbing mechanism, the combination with side members having longitudinally disposed interior surfaces; of pressure-transmitting elements relatively movable toward each other longitudinally of the mechanism, said elements and members having co-acting means thereon for effecting lateral approach of said members upon relative movement of said elements; a friction device having transversely disposed friction surfaces; a plurality of friction wedge blocks co-operating with the longitudinal surfaces of the side members and the transverse friction surfaces of the friction device; wedge shoes co-operating with the wedge blocks; and a main spring resistance co-operating with the wedge shoes.

4. In a friction shock absorbing mechanism, the combination with side members having wedge faces at the opposite ends thereof, each of said members having a longitudinally disposed surface; of front and rear follower acting members having wedge faces co-operating with the wedge faces of said side members, said followers being movable longitudinally of the mechanism toward each other for effecting lateral approach of said members; a friction device having longitudinal and transversely disposed friction surfaces; a plurality of friction wedge elements co-operating with the longitudinal surfaces of the side members and the longitudinal and transverse surfaces of said friction device; and a main spring resistance co-operating with said friction wedge elements.

5. In a friction shock absorbing mechanism, the combination with front and rear follower acting members relatively movable toward each other, said members being provided with wedge faces; of side members having longitudinally disposed interior surfaces and wedge faces co-operating with the wedge faces of said follower acting members; a friction member having transversely disposed friction surfaces; a plurality of friction wedge blocks co-operating with the longitudinally disposed surfaces of said side members and the transverse friction surfaces of said friction member; a plurality of additional wedge members co-acting with wedge blocks; and a main spring resistance interposed between each follower acting member and said additional wedge members.

6. In a friction shock absorbing mechanism, the combination with front and rear follower acting members relatively movable toward and from each other, said members having interior wedge faces; side members co-operating with the wedge faces of the front and rear follower acting members, each of said side members being provided with a longitudinally disposed interior surface; a central friction element having longitudinally and transversely disposed friction surfaces; of front and rear sets of friction wedge shoes co-operating with the longitudinal friction surfaces of said central element; a wedge block co-operating with each of said wedge friction shoes, each of said blocks having a pair of faces co-operating respectively with the longitudinal surface of one of said side members and one of the transverse friction surfaces of said central element; and a main spring resistance interposed between each set of friction wedge shoes and the corresponding main follower acting member.

7. In a friction shock absorbing mechanism, the combination with front and rear follower acting members; longitudinally disposed side column load transmitting members having their front and rear ends normally spaced from said follower members and engageable by said follower members upon full compression of the mechanism to limit the approach of said follower members, said side members and followers having co-acting means thereon for effecting relative lateral approach of the side members during movement of said followers toward each other; a floating friction member; a plurality of sets of wedge friction elements interposed between the friction member and the side members; and spring resistance elements interposed between said followers and the sets of wedge elements.

8. In a friction shock absorbing mechanism, the combination with front and rear follower acting members having wedge faces thereon; of longitudinally disposed side members having wedge faces co-operating with the wedge faces of said followers, said side members being adapted to approach each other upon relative movement of the followers; a friction member disposed between said followers, said friction member being provided with a plurality of set of friction surfaces angularly disposed with reference to each other; a plurality of sets of wedge friction elements co-operating with said side and friction members, the elements of each set having co-acting wedge faces and each set of elements co-operating with one of said sets of said angularly disposed friction surfaces; and a spring resistance co-operating with certain of said friction wedge elements.

In witness that I claim the foregoing I have hereunto subscribed my name this 4th day of September 1924.

STACY B. HASELTINE.